United States Patent [19]

Shyu

[11] Patent Number: 6,160,920
[45] Date of Patent: Dec. 12, 2000

[54] COSINE TRANSFORMING AND QUANTIZING DEVICE, METHOD OF REDUCING MULTIPLICATION OPERATIONS IN A VIDEO COMPRESSING APPARATUS

[75] Inventor: Rong-Fuh Shyu, Hsinchu, Taiwan

[73] Assignee: Winbond Electronics Corp., Hsinchu, Taiwan

[21] Appl. No.: 09/153,750

[22] Filed: Sep. 15, 1998

[51] Int. Cl.[7] .................................. G06K 9/36; G06K 9/46
[52] U.S. Cl. ........................... 382/250; 382/233; 382/251
[58] Field of Search ................................... 382/233, 250, 382/251, 277

[56] References Cited

U.S. PATENT DOCUMENTS

| | | | |
|---|---|---|---|
| 4,245,248 | 1/1981 | Netravali et al. . | |
| 5,321,725 | 6/1994 | Paik et al. . | |
| 5,408,425 | 4/1995 | Hou | 364/725 |
| 5,471,412 | 11/1995 | Shyu . | |
| 5,649,077 | 7/1997 | On et al. | 395/119 |
| 5,748,240 | 5/1998 | Carr et al. . | |
| 5,754,457 | 5/1998 | Eitan et al. | 362/725 |
| 5,822,003 | 10/1998 | Girod et al. | 348/401 |

*Primary Examiner*—Phuoc Tran
*Attorney, Agent, or Firm*—Christensen O'Connor Johnson & Kindness PLLC

[57] ABSTRACT

In order to reduce the number of multiplication operations in a video compressing apparatus, a predetermined original quantizer matrix is compensated with a set of scaling coefficients derived from a sixth intrinsic multiplication stage of a discrete cosine transform (DCT) fast algorithm to obtain a modified quantizer matrix. Thereafter, a DCT unit is configured to perform DCT on an input data block based on the DCT fast algorithm while dispensing with the sixth intrinsic multiplication stage of the DCT fast algorithm to result in scaled transform data. A quantizer is configured so as to quantize the scaled transform data in accordance with the modified quantizer matrix. To reduce the number of multiplication operations in a video decompressing apparatus, a predetermined original dequantizer matrix is compensated with a set of pre-scaling coefficients derived from a first intrinsic multiplication stage of an IDCT fast algorithm to obtain a modified dequantizer matrix. Thereafter, an inverse quantizer is configured so as to dequantize input quantized DCT data in accordance with the modified dequantizer matrix. An IDCT unit is configured to perform IDCT on the output of the inverse quantizer based on the IDCT fast algorithm while dispensing with the first intrinsic multiplication stage of the IDCT fast algorithm.

10 Claims, 6 Drawing Sheets

COSINE TRANSFORMING AND QUANTIZING DEVICE, METHOD OF REDUCING MULTIPLICATION OPERATIONS IN A VIDEO COMPRESSING APPARATUS

BACKGROUND OF THE INVENTION

1. Field of the Invention

The invention relates to video compression and decompression techniques, more particularly to a video compressing apparatus and a video decompressing apparatus that perform a reduced number of multiplication operations.

2. Description of the Related Art

Discrete cosine transform (DCT) is widely adopted in video compression algorithms, such as MPEG for motion picture coding, and JPEG for still picture coding. Similarly, inverse discrete cosine transform (IDCT) is adopted in the corresponding inverse process for decompression of compressed video data.

DCT and IDCT operations typically involve a plurality of multiplication and addition operations. In general, multiplication operations for DCT and IDCT processing are relatively time-consuming and require relatively complex hardware.

In U.S. Pat. No. 5,471,412, the entire disclosure of which is incorporated herein by reference, the applicant disclosed six-stage DCT/IDCT fast algorithms that involve only thirteen multiplication operations for one-dimensional transformation, or a total number of 208 (2×8×13) multiplication operations for two-dimensional transformation of an 8×8 data block. Flow graphs of the DCT and IDCT fast algorithms are shown in FIGS. 1 and 2, respectively. It is desirable to further reduce the number of multiplication operations in order to achieve a higher processing speed during video compression and/or video decompression.

SUMMARY OF THE INVENTION

Therefore, the object of the present invention is to provide a cosine transforming and quantizing device for use in a video compressing apparatus and that is capable of performing a reduced number of multiplication operations as compared to the prior art.

Another object of the present invention is to provide a method for reducing the number of multiplication operations in a video compressing apparatus to result in a higher processing speed.

Still another object of the present invention is to provide an inverse quantizing and inverse cosine transforming device for use in video compression and video decompression and that is capable of performing a reduced number of multiplication operations as compared to the prior art.

A further object of the present invention is to provide a method for reducing the number of multiplication operations in a video decompressing apparatus to result in a higher processing speed.

According to a first aspect of the invention, a cosine transforming and quantizing device for use in a video compressing apparatus comprises a discrete cosine transforming unit and a quantizer. The discrete cosine transforming unit performs discrete cosine transform (DCT) on an input data block based on a six-stage DCT fast algorithm. The discrete cosine transforming unit dispenses with a sixth intrinsic multiplication stage of the DCT fast algorithm to result in scaled transform data. The quantizer is connected to the discrete cosine transforming unit, and quantizes the scaled transform data in accordance with a modified quantizer matrix that is obtained by compensating a predetermined original quantizer matrix with a set of scaling coefficients derived from the sixth intrinsic multiplication stage of the DCT fast algorithm to result in quantized DCT data corresponding to the input data block.

According to a second aspect of the invention, there is provided a method of reducing the number of multiplication operations in a video compressing apparatus that includes a discrete cosine transforming unit and a quantizer connected to the discrete cosine transforming unit. The method includes the steps of: compensating a predetermined original quantizer matrix with a set of scaling coefficients derived from a sixth intrinsic multiplication stage of a six-stage discrete cosine transform (DCT) fast algorithm to obtain a modified quantizer matrix; configuring the discrete cosine transforming unit to perform DCT on an input data block based on the DCT fast algorithm while dispensing with the sixth intrinsic multiplication stage of the DCT fast algorithm to result in scaled transform data; and configuring the quantizer so as to quantize the scaled transform data in accordance with the modified quantizer matrix to result in quantized DCT data corresponding to the input data block.

According to a third aspect of the invention, an inverse quantizing and inverse cosine transforming device for use in video compression and video decompression comprises an inverse quantizer and an inverse discrete cosine transforming unit. The inverse quantizer dequantizes input quantized discrete cosine transform (DCT) data in accordance with a modified dequantizer matrix that is obtained by compensating a predetermined original dequantizer matrix with a set of pre-scaling coefficients derived from a first intrinsic multiplication stage of a six-stage inverse discre cosine transform (IDCT) fast algorithm to result in scaled dequantized data. The inverse discrete cosine transforming unit is connected to the inverse quantizer and is operable to perform IDCT on the scaled dequantized data based on the six-stage IDCT fast algorithm. The inverse discrete cosine transforming unit dispenses with the first intrinsic multiplication stage of the IDCT fast algorithm to result in IDCT data corresponding to the input quantized DCT data.

According to a fourth aspect of the invention, there is provided a method of reducing the number of multiplication operations in a video decompressing apparatus that includes an inverse quantizer and an inverse discrete cosine transforming unit connected to the inverse quantizer. The method includes the steps of: compensating a predetermined original dequantizer matrix with a set of pre-scaling coefficients derived from a first intrinsic multiplication stage of a six-stage inverse discrete cosine transform (IDCT) fast algorithm to obtain a modified dequantizer matrix; configuring the inverse quantizer so as to dequantize input quantized discrete cosine transform (DCT) data in accordance with the modified dequantizer matrix to result in scaled dequantized data; and configuring the inverse discrete cosine transforming unit to perform IDCT on the scaled dequantized data based on the IDCT fast algorithm while dispensing with the first intrinsic multiplication stage of the IDCT fast algorithm to result in IDCT data corresponding to the input quantized DCT data.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 3:
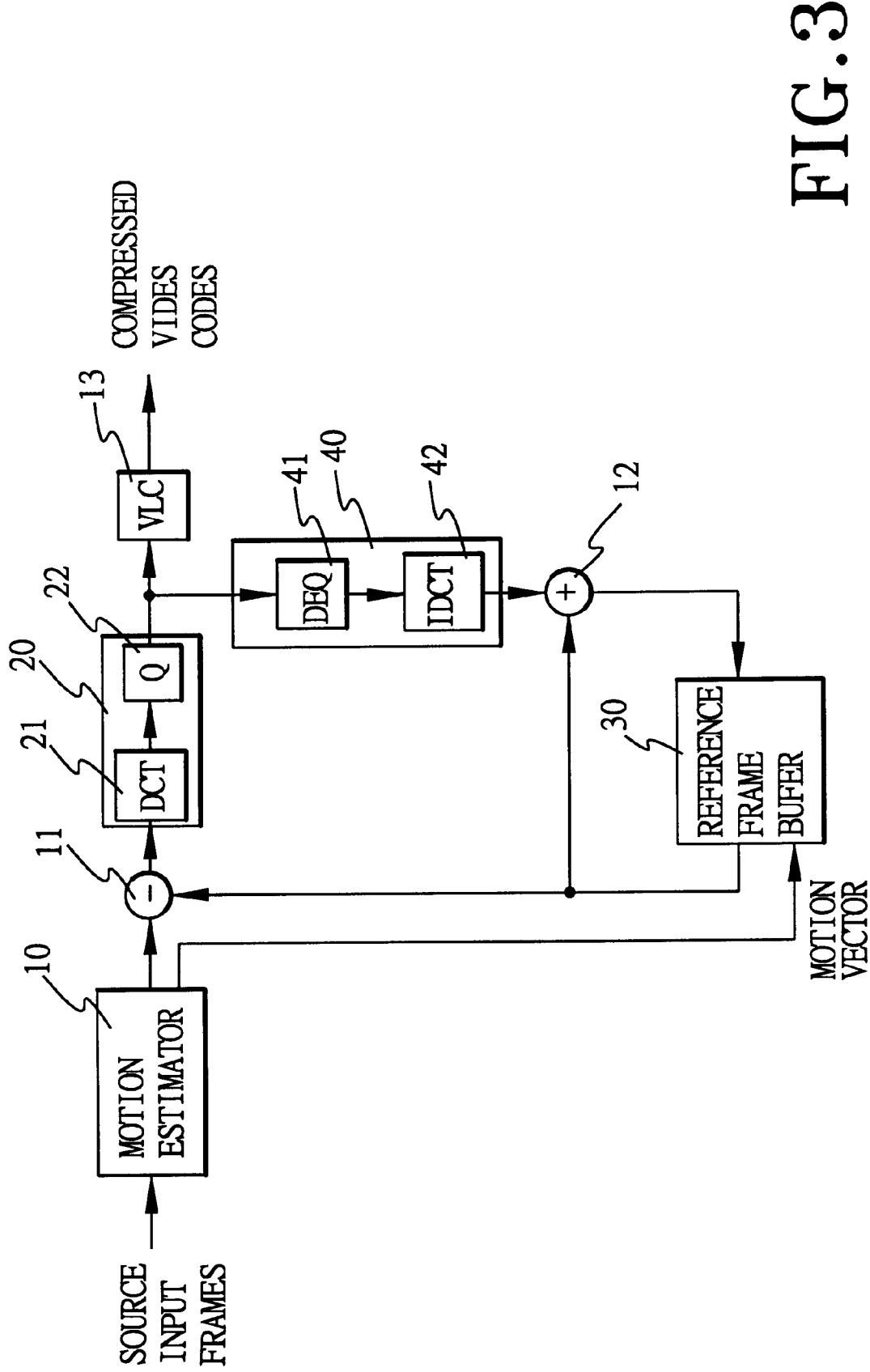
FIG. 3 is a schematic circuit block diagram of a video encoding apparatus that incorporates the preferred embodiments of a cosine transforming and quantizing device and an inverse quantizing and inverse transforming device according to the present invention.

FIG. 3 is a schematic circuit block diagram illustrating a video encoding apparatus that involves discrete cosine transform. A motion estimator 10 receives source input frames and performs motion estimation relative to a previous and/or a future input frame. The motion estimator 10 generates motion vectors in case the input frame is a predictive-coded frame or a bi-directional predictive-coded frame, both of which are commonly referred to as non-intra coded frames. Otherwise, for intra-coded frames, the input frame is provided directly to a cosine transforming and quantizing device 20 that includes a discrete cosine transforming (DCT) unit 21 and a quantizer (Q) 22 connected to the DCT unit 21. The DCT unit 21 performs discrete cosine transform on the input frame, and provides transform data to the quantizer 22. The quantizer 22 is responsible for quantizing the transform data from amplitudes that lie within a number of preset ranges to a set of finite levels. The non-intra coded frames are also processed by the cosine transforming and quantizing device 20, but only after reference pixel values that come from reference frames stored in a reference frame buffer 30 are subtracted from pixel values of the current frame via a subtracter 11. As such, in case of non-intra coded frames, the cosine transforming and quantizing device 20 only processes the differences of the pixel values. An inverse quantizing and inverse cosine transforming device 40 includes an inverse quantizer (DeQ) 41 and an inverse discrete cosine transforming (IDCT) unit 42 connected to the inverse quantizer 41. The inverse quantizer 41 performs the inverse operation of the quantizer 22. The IDCT unit 42 performs the inverse operation of the DCT unit 21. Reference frames for the non-intra coded frames are provided by an adder 12. The reference frames can be intra-coded frames that are stored directly in the reference frame buffer 30 after reconstruction by the inverse quantizing and inverse cosine transforming device 40. Alternatively, the reference frames can be predictive-coded frames that are further reconstructed with reference to a previous reference frame stored in the reference frame buffer 30. In this case, the adder 12 compensates the IDCT retrieved difference of the pixel values of the predictive-coded frame with its reference frame, and sends the reconstructed predictive-coded frame to the reference frame buffer 30. The motion vector from the motion estimator 10 is used to address the appropriate pixels of the reference frames in the reference frame buffer 30 for conducting the subtraction operation in order to encode non-intra coded frames, and for conducting the compensating operation in order to reconstruct the predictive-coded reference frames. A variable length encoder (VLC) 13 is connected to the output of the quantizer 22, and is used to perform entropy coding, such as Huffman coding, to map the quantized transform data to variable-length codes which are subsequently outputted as compressed video codes.

The motion estimator 10 removes inter-frame redundancy of the source input frames. The quantizer 22 removes insignificant portions of the video data, which are not sensitive to the human visual system. The variable length encoder 13 further compresses the video data by applying entropy coding techniques so as to result in compressed video data with a compression ratio ranging from tens to hundreds.

Figure 1:
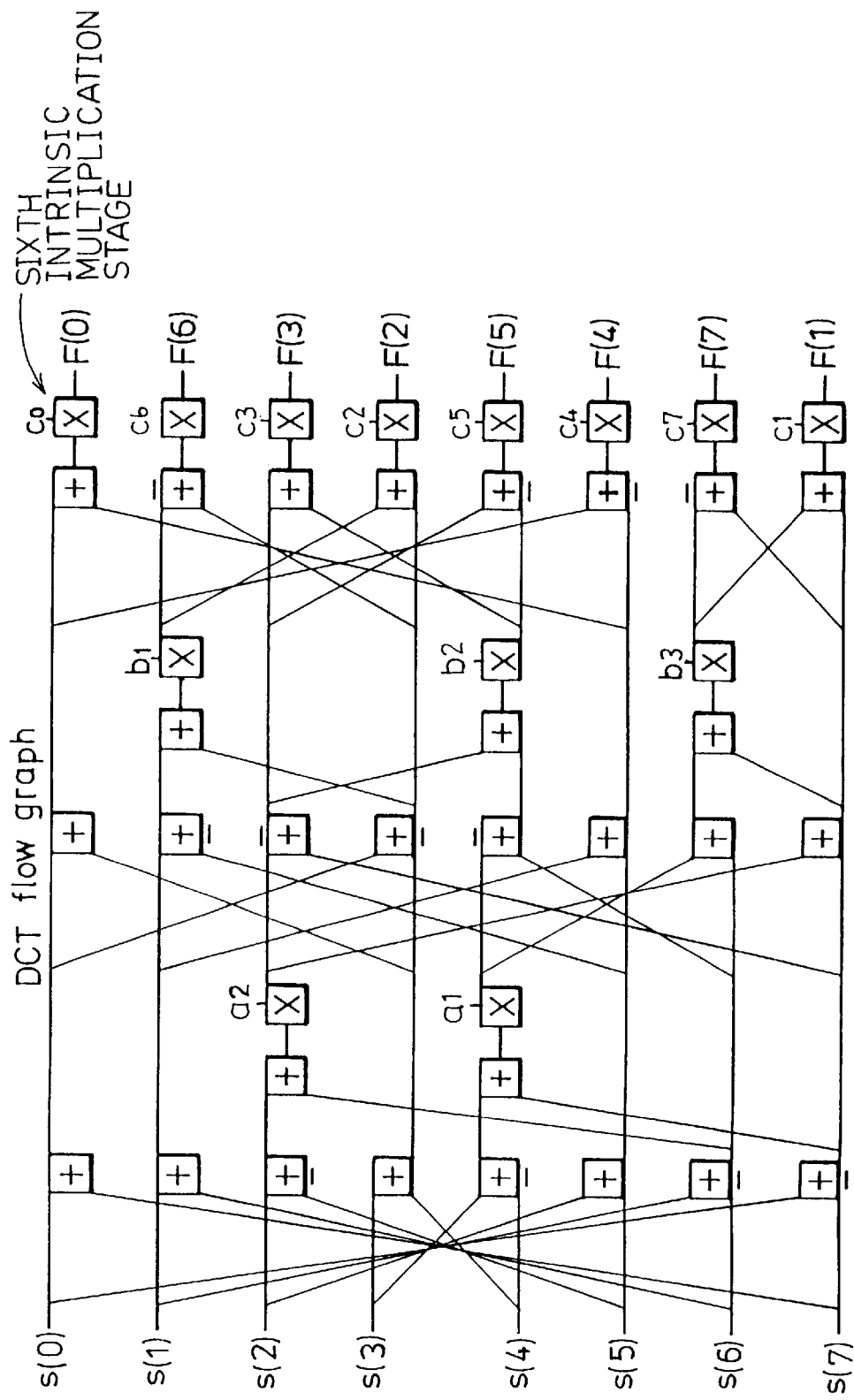
FIG. 1 is a flow graph of a six-stage DCT fast algorithm that is used in a one-dimensional transform operation of a DCT unit in the prior art.

If the source input frames are still images, like photographs, which have no inter-frame relationship, the video encoding apparatus of FIG. 1 can be reduced to comprise only the cosine transforming and quantizing device 20 and the variable length encoder 13. The motion estimator 10, the subtracter 11 for providing pixel value differences, the adder 12 for providing reference frames, the reference frame buffer 30 for storing the reference frames, and the inverse quantizing and inverse cosine transforming device 40 are omitted.

The general concepts of the encoding apparatus and the encoding process for video signals as described above are well known in the art, and are widely used in digital video compression technology, such as MPEG and JPEG. Examples of encoding apparatus that use a cosine transforming and quantizing device are disclosed in U.S. Pat. Nos. 5,748,240, 5,321,725 and 4,245,248.

Figure 4:
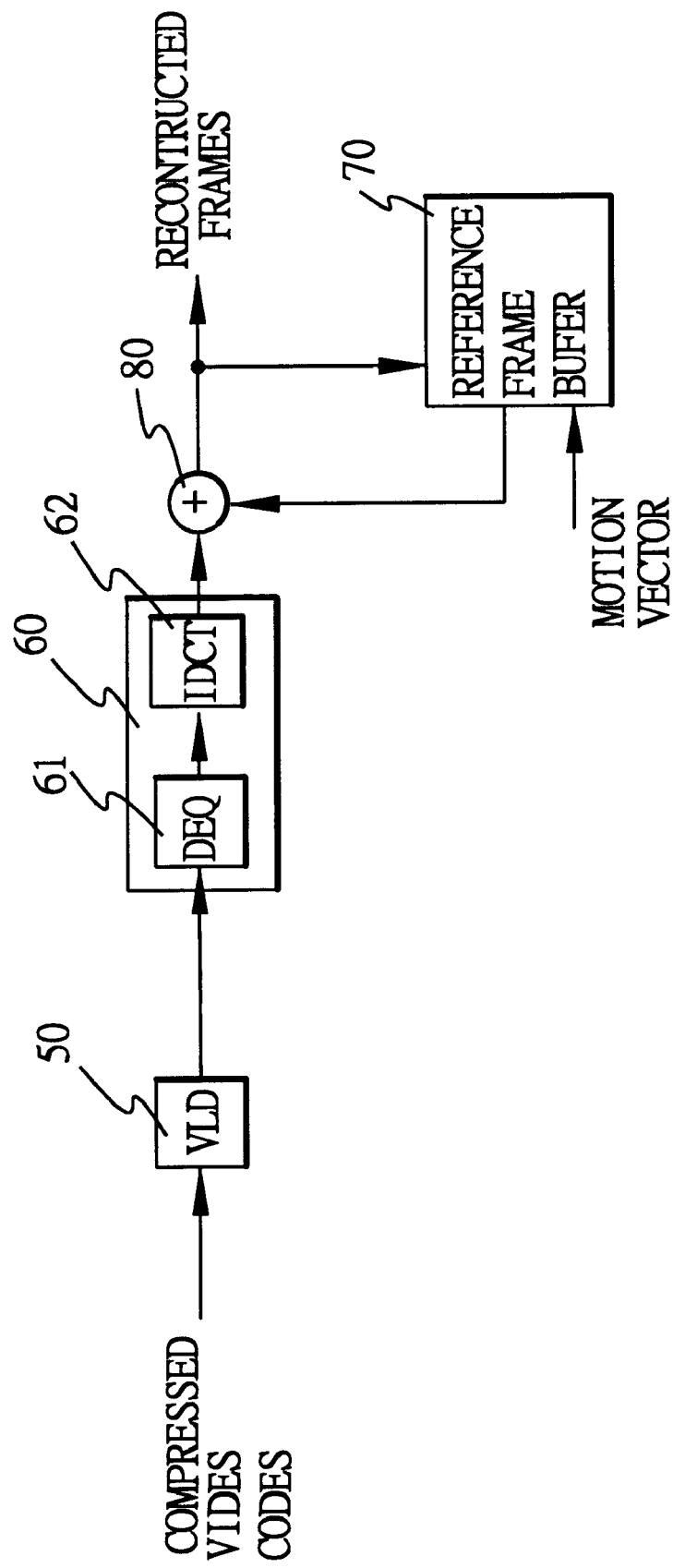
FIG. 4 is a schematic circuit block diagram of a video decoding apparatus that incorporates the preferred embodiment of the inverse quantizing and inverse transforming device according to the present invention.

FIG. 4 is a schematic circuit block diagram illustrating a video decoding apparatus that corresponds to the video encoding apparatus of FIG. 3. The video decoding apparatus comprises a variable length decoder (VLD) 50, an inverse quantizing and inverse cosine transforming device 60 including an inverse quantizer (DeQ) 61 and an inverse discrete cosine transforming (IDCT) unit 62 connected to the inverse quantizer 61, a reference frame buffer 70, and an adder 80. The variable length decoder 50 processes the compressed video codes, which are variable length codes, to obtain the quantized DCT data. The inverse quantizer 61 performs an inverse quantization operation on the quantized DCT data to obtain dequantized DCT data. The IDCT unit 62 performs IDCT on the dequantized DCT data from the quantizer 61 to obtain IDCT data, which are pixel values for intra-coded frames, and differences of pixel values with reference frames for non-intra coded frames. The function of the reference frame buffer 70 is the same as that of the reference frame buffer 30 in the video encoding apparatus of FIG. 3. The adder 80 compensates the IDCT data with the reference frames coming from the reference frame buffer 70 for the non-intra coded frames. The compensated non-intra coded frames and the intra-coded frames from the IDCT unit 62 constitute the reconstructed frames. The reconstructed intra-coded frames and the predictive-coded frames are also stored in the reference frame buffer 70 to serve as reference frames. The reference frame buffer 70 has a motion vector input for addressing the appropriate pixels of the reference frames in the reference frame buffer 70 for conducting the compensating operation when reconstructing the non-intra coded frames.

Similarly, if the compressed video codes only involve still images, like photographs, which have no inter-frame relationship, the video decoding apparatus of FIG. 4 can be reduced to comprise only the variable length decoder 50 and the inverse quantizing and inverse cosine transforming device 60. The reference frame buffer 70 and the adder 80 for reconstructing the non-intra coded frames are omitted.

The general concepts of the decoding apparatus and the decoding process for video signals as described above are also well known in the art, and are widely used in digital video decompression technology, such as MPEG and JPEG.

In a cosine transforming and quantizing device, the discrete cosine transforming operation is always followed by the quantizing operation. Moreover, in an inverse quantizing and inverse cosine transforming device, the inverse quantizing operation is always followed by the inverse discrete cosine transforming operation.

The DCT/IDCT apparatus disclosed by the applicant in U.S. Pat. No. 5,471,412 performs DCT on an 8×8 input data block based on the six-stage DCT fast algorithm shown in FIG. 1, and further performs IDCT on an 8×8 input transformed data block based on the six-stage IDCT fast algorithm shown in FIG. 2.

As shown in FIG. 1, the six stages of the DCT fast algorithm include a first stage involving four butterfly operations, a second stage involving two post-addition multiplication operations, a third stage involving four butterfly operations, a fourth stage involving three post-addition multiplication operations, a fifth stage involving four butterfly operations, and a sixth stage involving eight intrinsic multiplication operations. Two-dimensional DCT involves consecutive first and second one-dimensional DCT operations. The second one-dimensional DCT operation is performed on a transposed order of the one-dimensional transform data from the first one-dimensional DCT operation to obtain the two-dimensional transform data corresponding to the input data block.

Figure 2:
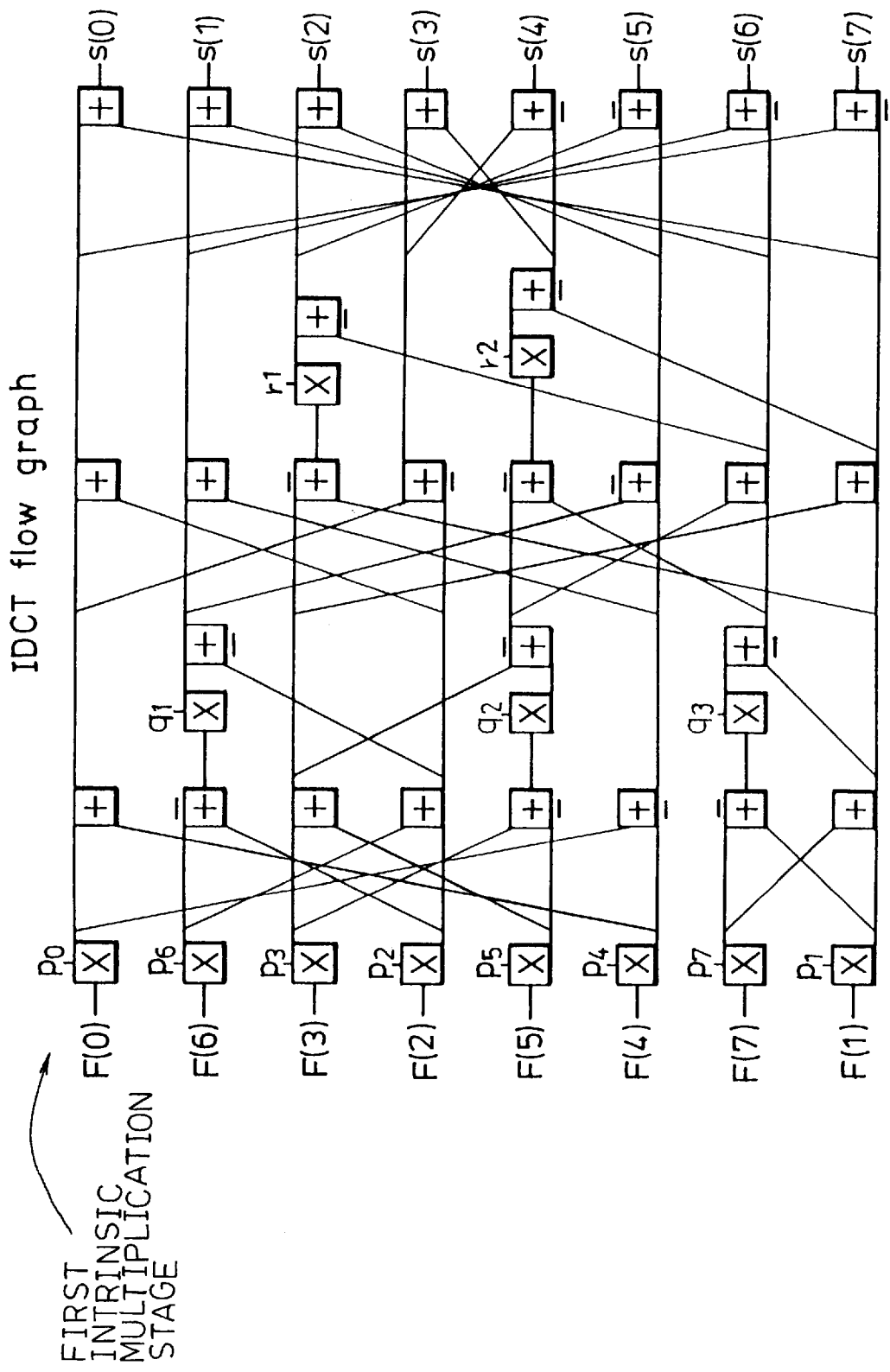
FIG. 2 is a flow graph of a six-stage IDCT fast algorithm that is used in a one-dimensional inverse transform operation of an IDCT unit in the prior art.

As shown in FIG. 2, the six stages of the IDCT fast algorithm include a first stage involving eight intrinsic multiplication operations, a second stage involving four butterfly operations, a third stage involving three post-multiplication subtraction operations, a fourth stage involving four butterfly operations, a fifth stage involving two post-multiplication subtraction operations, and a sixth stage involving four butterfly operations. Two-dimensional IDCT involves consecutive first and second one-dimensional IDCT operations. The second one-dimensional IDCT operation is performed on a transposed order of the one-dimensional inverse transform data from the first one-dimensional IDCT operation to obtain the two-dimensional inverse transform data corresponding to the input transformed data block.

In the quantizer of the cosine transforming and quantizing device, quantization is performed on an 8×8 block basis using a predetermined quantizer matrix adaptable for different image attributes. That is to say, the predetermined quantizer matrix may differ for luminance and chrominance components, for intra-coded and non-intra coded frames, and for one video sequence to another video sequence, and so on. A fundamental formula of quantization is:

$$M(i,j)=f(i,j)/Q(i,j)$$

Where
- i,j=0, 1, . . . 7,
- f(i,j) represents DCT data,
- Q(i,j) represents the predetermined quantizer matrix, and
- M(i,j) represents the quantized transform data.

In the inverse quantizer of the inverse quantizing and inverse cosine transforming device, inverse quantization is also performed on an 8×8 block basis using a predetermined dequantizer matrix. A fundamental formula of dequantization is:

$$f'(i,j)=M(i,j)*Q(i,j)$$

Where
- i,j=0, 1, . . . 7,
- f'(i,j) represents dequantized transform data,
- Q(i,j) represents the predetermined dequantizer matrix, and
- M(i,j) represents the quantized transform data.

Referring again to FIG. 3, unlike the prior art, the cosine transforming and quantizing device 20 of the preferred embodiment according to the present invention is characterized in that the DCT unit 21 performs DCT on the input data block based on the DCT fast algorithm while dispensing with the sixth intrinsic multiplication stage of the DCT fast algorithm to result in scaled transform data. Accordingly, the quantizer 22 is configured so as to quantize the scaled transform data in accordance with a modified quantizer matrix that is obtained by compensating the predetermined original quantizer matrix with a set of scaling coefficients derived from the sixth intrinsic multiplication stage of the DCT fast algorithm to result in quantized DCT data corresponding to the input data block with no performance degradation. The overall processing speed of the cosine transforming and quantizing device 20 is thus greatly enhanced.

By dispensing with the sixth intrinsic multiplication stage of the DCT fast algorithm, the number of multiplication operations performed by the DCT unit 21 can be dramatically reduced. Particularly, for one-dimensional DCT transformation, the total number of multiplication operations is reduced from thirteen to five for an 8×8 input data block, i.e. only about 38% of the multiplication operations remain for scaled one-dimensional DCT. For two-dimensional DCT transformation, only a total number of eighty (2×8×5) multiplication operations are required for completing scaled two-dimensional DCT of the 8×8 input data block.

Figures 5, 6:
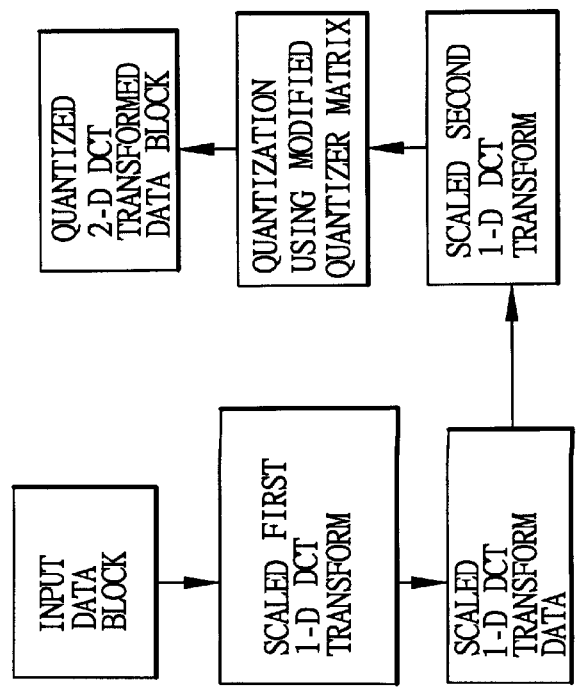
FIG. 5 is a flowchart illustrating the operation of the cosine transforming and quantizing device of the preferred embodiment.
FIG. 6 illustrates a set of scaling coefficients used in modifying a quantizer matrix of a quantizer of the preferred embodiment.

The scaled transform data from the DCT unit 21 of the preferred embodiment is two-dimensional transform data. FIG. 5 is a flowchart illustrating the operation of the cosine transforming and quantizing device 20. Initially, the DCT unit 21 performs a scaled first one-dimensional transform operation consisting of the first to fifth stages of the DCT fast algorithm shown in FIG. 1 on the input data block to obtain scaled one-dimensional transform data. Thereafter, the DCT unit 21 performs a scaled second one-dimensional transform operation consisting of the first to fifth stages of the DCT fast algorithm on a transposed order of the scaled one-dimensional transform data to obtain the scaled two-dimensional transform data. The quantizer 22 then quantizes the scaled two-dimensional transform data in accordance with the modified quantizer matrix to result in the quantized two-dimensional DCT data block corresponding to the input data block.

The modified quantizer matrix Q'(i,j) is obtained according to the following equation:

$$Q'(i,j)=Q(i,j)/C(i,j)$$

Where Q(i,j) represents the predetermined original quantizer matrix, and C(i,j) represents the set of scaling coefficients. As shown in FIG. 6, the set of scaling coefficients C(i,j) is a product of sixth-stage weighing coefficients of the DCT fast algorithm in a first one-dimensional DCT transform and in a second one-dimensional DCT transform.

Other terms may be associated with the quantization formula, such as rounding off for sign consideration of the scaled transform data, and incorporating a scaler to the quantizer matrix (e.g. quantizer scale in MPEG). If associated terms are present, the set of scaling coefficients are also factored into these terms before the quantization operation is performed.

Accordingly, in order to reduce the number of multiplication operations in a video compressing apparatus that includes a DCT unit 21 and a quantizer 22 connected to the DCT unit 21, a predetermined original quantizer matrix is compensated with a set of scaling coefficients derived from a sixth intrinsic multiplication stage of a six-stage discrete cosine transform (DCT) fast algorithm to obtain a modified quantizer matrix. Thereafter, the DCT unit 21 is configured to perform DCT on an input data block based on the DCT fast algorithm while dispensing with the sixth intrinsic multiplication stage of the DCT fast algorithm to result in scaled transform data. The quantizer 22 is configured so as to quantize the scaled transform data in accordance with the modified quantizer matrix to result in quantized DCT data corresponding to the input data block.

As such, the quantization operation essentially incurs a minor increase in overhead. However, the DCT operation experiences a tremendous reduction in loading. The overall performance is thus improved when the cosine transforming and quantizing device 20 is used during video compression.

Referring again to FIGS. 3 and 4, the inverse quantizing and inverse cosine transforming device 40, 60 of the preferred embodiment according to the present invention is characterized in that the inverse quantizer 41, 61 is configured so as to dequantize the input quantized DCT data in accordance with a modified dequantizer matrix that is obtained by compensating a predetermined original dequantizer matrix with a set of pre-scaling coefficients derived from the first intrinsic multiplication stage of the IDCT fast algorithm to result in scaled dequantized data. Thereafter, the IDCT unit 42, 62 performs IDCT on the scaled dequantized data based on the six-stage IDCT fast algorithm while dispensing with the first intrinsic multiplication stage of the IDCT fast algorithm to result in IDCT data corresponding to the input quantized DCT data with no performance degradation. The overall processing speed of the inverse quantizing and inverse cosine transforming device 40, 60 is thus greatly enhanced.

By dispensing with the first intrinsic multiplication stage of the IDCT fast algorithm, the number of multiplication operations performed by the IDCT unit 42, 62 can be dramatically reduced. Particularly, for one-dimensional IDCT transformation, the total number of multiplication operations is reduced from thirteen to five for an 8×8 input transformed data block, i.e. only about 38% of the multiplication operations remain for scaled one-dimensional IDCT. For two-dimensional IDCT transformation, only a total number of eighty (2×8×5) multiplication operations are required for completing scaled two-dimensional IDCT of the 8×8 input transformed data block.

Figures 7, 8:
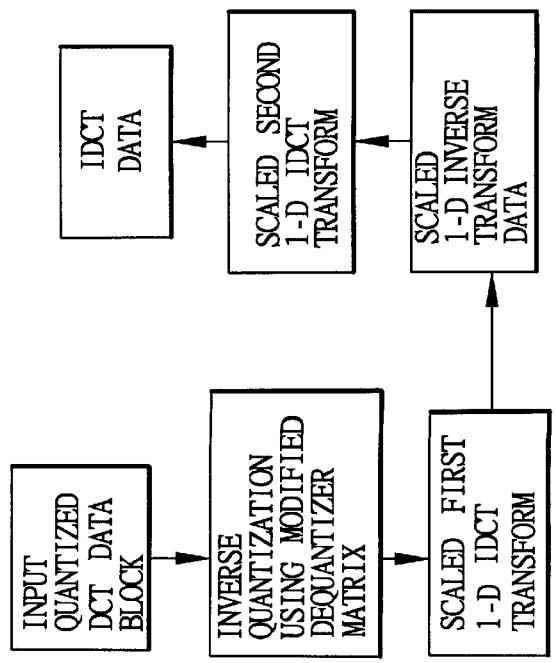
FIG. 7 is a flowchart illustrating the operation of the inverse quantizing and inverse cosine transforming device of the preferred embodiment.
FIG. 8 illustrates a set of pre-scaling coefficients used in modifying a dequantizer matrix of an inverse quantizer of the preferred embodiment.

The IDCT data from the IDCT unit 42, 62 of the preferred embodiment is two-dimensional IDCT transform data. FIG. 7 is a flowchart illustrating the operation of the inverse quantizing and inverse cosine transforming device 40, 60 of FIGS. 3 and 4. Initially, the inverse quantizer 41, 61 dequantizes the input quantized DCT data block in accordance with the modified dequantizer matrix to result in scaled dequantized data. Thereafter, the IDCT unit 42, 62 performs a scaled first one-dimensional inverse transform operation consisting of second to sixth stages of the IDCT fast algorithm on the scaled dequantized data to obtain scaled one-dimensional inverse transform data. The IDCT unit 42, 62 further performs a scaled second one-dimensional inverse transform operation consisting of the second to sixth stages of the IDCT fast algorithm on a transposed order of the scaled one-dimensional inverse transform data to obtain the IDCT data corresponding to the input quantized DCT data block.

The modified dequantizer matrix Q'(i,j) is obtained according to the following equation:

$$Q'(i,j)=Q(i,j)*P(i,j)$$

Where Q(i,j) represents the predetermined original dequantizer matrix, and P(i,j) represents the set of pre-scaling coefficients. As shown in FIG. 8, the set of pre-scaling coefficients P(i,j) is a product of first-stage weighing coefficients of the IDCT fast algorithm in a first one-dimensional IDCT transform and in a second one-dimensional IDCT transform.

Other terms may be associated with the dequantization formula, such as adjustment for sign consideration of the quantized and dequantized DCT transform data, and incorporating a scaler to the quantizer matrix (e.g. quantizer scale in MPEG). If associated terms are present, the set of pre-scaling coefficients is also factored into these terms before the dequantization operation is performed.

Accordingly, in order to reduce the number of multiplication operations in a video decompressing apparatus that includes an inverse quantizer 41, 61 and an IDCT unit 42, 62 connected to the inverse quantizer 41, 61, a predetermined original dequantizer matrix is compensated with a set of pre-scaling coefficients derived from a first intrinsic multiplication stage of a six-stage IDCT fast algorithm to obtain a modified dequantizer matrix. Thereafter, the inverse quantizer 41, 61 is configured so as to dequantize input quantized DCT data in accordance with the modified dequantizer matrix to result in scaled dequantized data. The IDCT unit 42, 62 is configured to perform IDCT on the scaled dequantized data based on the IDCT fast algorithm while dispensing with the first intrinsic multiplication stage of the IDCT fast algorithm to result in IDCT data corresponding to the input quantized DCT data.

As such, the inverse quantization operation essentially incurs a minor increase in overhead. However, the IDCT operation experiences a tremendous reduction in loading. The overall performance is thus improved when the inverse quantizing and inverse cosine transforming device 40, 60 is used during video decompression.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A cosine transforming and quantizing device for use in a video compressing apparatus, comprising:

a discrete cosine transforming unit for performing discrete cosine transform (DCT) on an input data block based on a six-stage DCT fast algorithm, said discrete cosine transforming unit dispensing with a sixth intrinsic multiplication stage of the DCT fast algorithm to result in scaled transform data; and a quantizer connected to said discrete cosine transforming unit for quantizing the scaled transform data in accordance with a modified quantizer matrix that is obtained by compensating a predetermined original quantizer matrix with a set of scaling coefficients derived from the sixth intrinsic multiplication stage of the DCT fast algorithm to result in quantized DCT data corresponding to the input data block.

2. The cosine transforming and quantizing device as claimed in claim 1, wherein the scaled transform data is two-dimensional transform data, said discrete cosine transforming unit performing a scaled first one-dimensional transform operation consisting of first to fifth stages of the DCT fast algorithm on the input data block to obtain scaled one-dimensional transform data, and further performing a scaled second one-dimensional transform operation consisting of the first to fifth stages of the DCT fast algorithm on a transposed order of the scaled one-dimensional transform data to obtain the scaled transform data, the set of scaling coefficients used in compensating the predetermined original quantizer matrix being a product of sixth-stage weighing coefficients of the DCT fast algorithm in a first one-dimensional DCT transform and in a second one-dimensional DCT transform.

3. A method of reducing number of multiplication operations in a video compressing apparatus that includes a discrete cosine transforming unit and a quantizer connected to the discrete cosine transforming unit, said method comprising the steps of:

compensating a predetermined original quantizer matrix with a set of scaling coefficients derived from a sixth intrinsic multiplication stage of a six-stage discrete cosine transform (DCT) fast algorithm to obtain a modified quantizer matrix;

configuring the discrete cosine transforming unit to perform DCT on an input data block based on the DCT fast algorithm while dispensing with the sixth intrinsic multiplication stage of the DCT fast algorithm to result in scaled transform data; and configuring the quantizer so as to quantize the scaled transform data in accordance with the modified quantizer matrix to result in quantized DCT data corresponding to the input data block.

4. The method as claimed in claim 3, wherein the scaled transform data is two-dimensional transform data, the discrete cosine transforming unit being configured to perform a scaled first one-dimensional transform operation consisting of first to fifth stages of the DCT fast algorithm on the input data block to obtain scaled one-dimensional transform data, and to further perform a scaled second one-dimensional transform operation consisting of the first to fifth stages of the DCT fast algorithm on a transposed order of the scaled one-dimensional transform data to obtain the scaled transform data, the set of scaling coefficients used in compensating the predetermined original quantizer matrix being a product of sixth-stage weighing coefficients of the DCT fast algorithm in a first one-dimensional DCT transform and in a second one-dimensional DCT transform.

5. The method as claimed in claim 3, the video compressing apparatus further including an inverse quantizer and an inverse discrete cosine transforming unit connected to the inverse quantizer, wherein said method further comprises the steps of:

compensating a predetermined original dequantizer matrix with a set of pre-scaling coefficients derived from a first intrinsic multiplication stage of a six-stage inverse discrete cosine transform (IDCT) fast algorithm to obtain a modified dequantizer matrix;

configuring the inverse quantizer so as to dequantize the quantized DCT data in accordance with the modified dequantizer matrix to result in scaled dequantized data; and configuring the inverse discrete cosine transforming unit to perform IDCT on the scaled dequantized data based on the IDCT fast algorithm while dispensing with the first intrinsic multiplication stage of the IDCT fast algorithm to result in IDCT data corresponding to the quantized DCT data.

6. The method as claimed in claim 5, wherein the IDCT data is two-dimensional inverse transform data, the inverse discrete cosine transforming unit being configured to perform a scaled first one-dimensional inverse transform operation consisting of second to sixth stages of the IDCT fast algorithm on the scaled dequantized data to obtain scaled one-dimensional inverse transform data, and to further perform a scaled second one-dimensional inverse transform operation consisting of the second to sixth stages of the IDCT fast algorithm on a transposed order of the scaled one-dimensional inverse transform data to obtain the IDCT data, the set of pre-scaling coefficients used in compensating the predetermined original dequantizer matrix being a product of first-stage weighing coefficients of the IDCT fast algorithm in a first one-dimensional IDCT transform and in a second one-dimensional IDCT transform.

7. An inverse quantizing and inverse cosine transforming device for use in video compression and video decompression, comprising:

an inverse quantizer for dequantizing input quantized discrete cosine transform (DCT) data in accordance with a modified dequantizer matrix that is obtained by compensating a predetermined original dequantizer matrix with a set of pre-scaling coefficients derived from a first intrinsic multiplication stage of a six-stage inverse discre cosine transform (IDCT) fast algorithm to result in scaled dequantized data; and an inverse discrete cosine transforming unit connected to said inverse quantizer and operable to perform IDCT on the scaled dequantized data based on the six-stage IDCT fast algorithm, said inverse discrete cosine transforming unit dispensing with the first intrinsic multiplication stage of the IDCT fast algorithm to result in IDCT data corresponding to the input quantized DCT data.

8. The inverse quantizing and inverse cosine transforming device as claimed in claim 7, wherein the IDCT data is two-dimensional inverse transform data, said inverse discrete cosine transforming unit performing a scaled first one-dimensional inverse transform operation consisting of second to sixth stages of the IDCT fast algorithm on the scaled dequantized data to obtain scaled one-dimensional inverse transform data, and further performing a scaled second one-dimensional inverse transform operation consisting of the second to sixth stages of the IDCT fast algorithm on a transposed order of the scaled one-dimensional inverse transform data to obtain the IDCT data, the set of pre-scaling coefficients used in compensating the predetermined original dequantizer matrix being a product of first-stage weighing coefficients of the IDCT fast algorithm in a first one-dimensional IDCT transform and in a second one-dimensional IDCT transform.

9. A method of reducing number of multiplication operations in a video decompressing apparatus that includes an inverse quantizer and an inverse discrete cosine transforming unit connected to the inverse quantizer, said method comprising the steps of:

compensating a predetermined original dequantizer matrix with a set of pre-scaling coefficients derived from a first intrinsic multiplication stage of a six-stage inverse discrete cosine transform (IDCT) fast algorithm to obtain a modified dequantizer matrix;

configuring the inverse quantizer so as to dequantize input quantized discrete cosine transform (DCT) data in accordance with the modified dequantizer matrix to result in scaled dequantized data; and configuring the inverse discrete cosine transforming unit to perform IDCT on the scaled dequantized data based on the IDCT fast algorithm while dispensing with the first intrinsic multiplication stage of the IDCT fast algorithm to result in IDCT data corresponding to the input quantized DCT data.

10. The method as claimed in claim 9, wherein the IDCT data is two-dimensional inverse transform data, the inverse discrete cosine transforming unit being configured to perform a scaled first one-dimensional inverse transform operation consisting of second to sixth stages of the IDCT fast algorithm on the scaled dequantized data to obtain scaled one-dimensional inverse transform data, and to further perform a scaled second one-dimensional inverse transform operation consisting of the second to sixth stages of the IDCT fast algorithm on a transposed order of the scaled one-dimensional inverse transform data to obtain the IDCT data, the set of pre-scaling coefficients used in compensating the predetermined original dequantizer matrix being a product of first-stage weighing coefficients of the IDCT fast algorithm in a first one-dimensional IDCT transform and in a second one-dimensional IDCT transform.

* * * * *